United States Patent [19]

Vandenbulcke et al.

[11] Patent Number: 4,755,817

[45] Date of Patent: Jul. 5, 1988

[54] DATA TRANSMISSION SYSTEM HAVING TRANSMISSION INTERVALS WHICH ARE ADJUSTABLE FOR DATA WORDS OF VARIOUS LENGTHS

[75] Inventors: Christian J. B. O. E. Vandenbulcke; Eric H. J. Persoon, both of Eindhoven, Netherlands

[73] Assignee: U.S. Philips Corporation, New York, N.Y.

[21] Appl. No.: 39,820

[22] Filed: Apr. 15, 1987

Related U.S. Application Data

[63] Continuation of Ser. No. 582,422, Feb. 22, 1984, abandoned.

[51] Int. Cl.⁴ .............................................. H04Q 1/00
[52] U.S. Cl. .......................... 340/825.57; 340/825.58
[58] Field of Search .............. 370/79, 82, 80, 83, 370/91, 94, 99, 112, 84, 106, 105; 375/8, 17, 20, 106; 340/825.57, 825.58; 364/900, 200

[56] References Cited

U.S. PATENT DOCUMENTS

| | | | |
|---|---|---|---|
| 3,289,083 | 11/1966 | Barr et al. | 375/8 X |
| 3,638,195 | 1/1972 | Brender et al. | 364/200 |
| 3,700,820 | 10/1972 | Blasbalg et al. | 370/82 |
| 3,711,650 | 1/1973 | Kuhn et al. | 370/80 |
| 4,039,757 | 8/1977 | Frisone | 370/82 X |
| 4,205,200 | 5/1980 | Parikh et al. | 370/83 |
| 4,410,889 | 10/1983 | Bryant et al. | 370/82 X |

Primary Examiner—Ulysses Weldon
Attorney, Agent, or Firm—Thomas A. Briody; Jack E. Haken; Anne E. Barschall

[57] ABSTRACT

A data transmission system comprising a control unit, a transmitter and a receiver, the transmitter and receiver being connected by a transmission line for the serial transmission of a series of data words in a sequence of subsequent data bits. The control unit is provided with a word select signal generator for generating a two level word select signal for selecting, under control of a level change, a data word to be transmitted. The time length between two successive level changes of the word select signal is variable.

18 Claims, 4 Drawing Sheets

DATA TRANSMISSION SYSTEM HAVING TRANSMISSION INTERVALS WHICH ARE ADJUSTABLE FOR DATA WORDS OF VARIOUS LENGTHS

This is a continuation of application Ser. No. 582,422, filed Feb. 22, 1984, now abandoned.

BACKGROUND OF THE INVENTION

1. Field of the invention

The invention relates to a data transmission system comprising a control unit, a transmitter and a receiver, said transmitter and said receiver being connected by a transmission line for the serial transmission of a series of data words in a sequence of subsequent data bits. Said control unit comprises clock means for supplying to the system a clock pulse signal, and a word select signal generator. Said word select signal generator having a first clock input for receiving said clock pulse signal and being provided with first means for generating a two level word select signal for selecting under control of a level change a data word to be transmitted. Said word select signal being supplied to said transmitter and said receiver. Said transmitter comprising storage means for temporally storing a data word to be transmitted.

2. Description of the Prior Art

A control unit to be used in such a data transmission system is for example known and realized in the device for the type CX899 of the Sony Corporation. The known device is used as control unit for an audio system. The word select signal generator generates a word select signal with a fixed period. Between two successive level changes of the word select signal a data word can be transmitted. Each time that the level of the word select signal changes another data word is selected. The fixed period of the word select signal corresponds with a fixed number of clock pulses of the clock pulse signal.

A drawback of the known system is that the period of the word select signal is fixed. Therefore only a data word with a fixed number of bits can be transmitted from the transmitter to the receiver. If the data word to be transmitted contains less bits than said fixed number, the transmitted data word has to be completed. An inefficient use of the transmission line is therefore the consequence. If the data word to be transmitted contains more bits than said fixed number, than the whole data word can not completely be transmitted.

SUMMARY OF THE INVENTION

It is an object of the invention to provide a data transmission system wherein the period of the word select signal is not fixed, but wherein the time length between two successive level changes of the word select signal is adaptable to different data words which comprise different numbers of data bits.

Another object of this invention is to provide a data transmission system where there is a well defined relation between the word select signal and a first bit of a data word to be transmitted.

According to one aspect of this invention, the control unit comprises a word select signal generator which is provided with first means for setting the time length between two successive level changes of said word select signal to a set of different time values, whereby each of said different time values of said set corresponds to a whole number of clock pulses of said clock pulse signal, and wherein said transmitter comprises transmission control means having a second clock signal input for receiving said clock pulse signal, and a second input connected with said signal output, said transmission control means being provided with second means for loading into said storage means under control of a level change of said word select signal a data word to be transmitted. The first means of the word select signal generator enables a setting of the time length between two successive level changes of said word select signal to a set of different time values, threfore the word select signal has no longer a fixed period, because now a level change of the work select signal can occur after any multiple of clock pulses. By loading a data word into said storage means under control of a level change of said word select signal there is a cooperation between data words of variable bit length and a word select signal of variable time length between two successive level changes.

According to another aspect of this invention said transmission control means being provided with third means for outputting at said data output a first data bit of said loaded data word at least a half clock pulse period later with respect to said received level change of said word select signal. There is thus a well defined relation between the word select signal and a first bit of a data word to be transmitted.

Preferably the first data bit of a data word to be transmitted is the most significant bit of said word. The advantage thereof is that by using data words of different word length, the position of the most significant bit is then always known.

According to a further aspect of this invention said receiver comprises a storage element for temporarily storing a received data word, said storage element having a data input connected to said transmission line, said storage element comprising an array of selectively addressable storage cells, said storage cells being selectively addressed under control of successive received clock pulses. By using an array of selectively addressable storage cells, it is easy to recognize where the data bits of data words with different word length are stored.

Preferably the control unit acts as a master and said transmitter and said receiver acts as a slave. In this way no conflicts between different masters can occur.

DESCRIPTION OF THE PREFERRED EMBODIMENTS:

The invention will now be described in detail with reference to the accompanying drawings. The invention will be described as used in a digital audio system. It shall be evident that this is only an example and that the invention is not limited to audio systems. The invention can be used in any data transmission system where data words are transmitted serially in a sequence of successive data bits.

Figure 1:
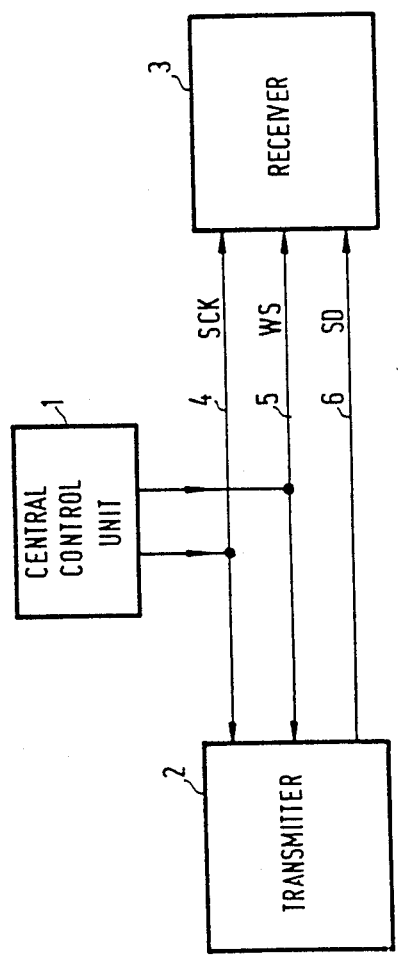
FIG. 1 shows a simplified embodiment of a digital audio system in which the invention is applicable.

FIG. 1 shows a simplified embodiment of a digital audio system in which the invention is applicable. The digital audio system comprises a central control unit 1, a transmitter 2 and a receiver 3. The central control unit supplies a clock pulse signal (SCK) to a serial clock line 4 and a word select signal (WS) to a word select line 5. The data flow between the transmitter and the receiver is transported via a serial data transmission line 6 (SD). The transmitter and the receiver are controlled by the clock pulses signal (SCK) and the word select signal supplied by the central control unit. It shall be evident that the central control unit can also be included either in the transmitter or in the receiver.

Figure 2:
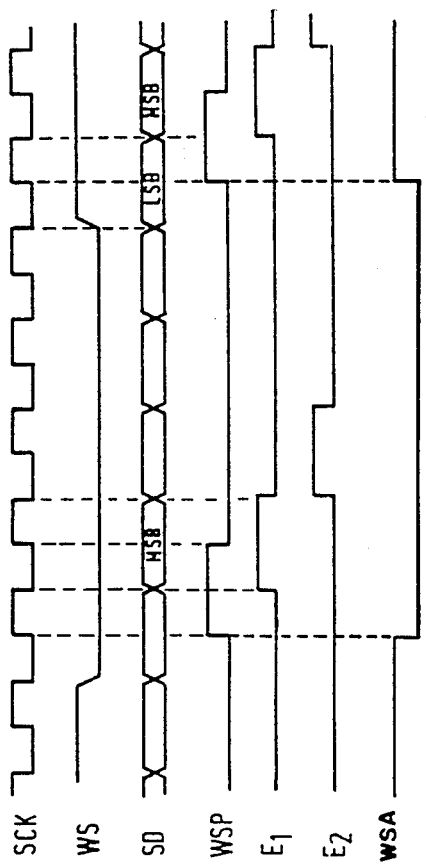
FIGS. 2(a), 2(b), 2(c), 2(d), 2(e) and 2(f) 2(g) show signal patterns of signals used in a data transmission system according to the invention.

FIG. 2(a) shows the pattern of the clock pulse signal (SCK) and FIG. 2(b) the pattern of the word select signal (WS). The clock pulse signal is generated in a well known manner by a clock. The word select signal is a two level signal which level changes each time that another word has to be transmitted. For this preferred embodiment a choice is made which implies that a level change of signal WS always occurs simultaneously with a trailing edge of the clock pulse signal. It shall be evident that the invention is not limited to that particular choice.

Figure 3:
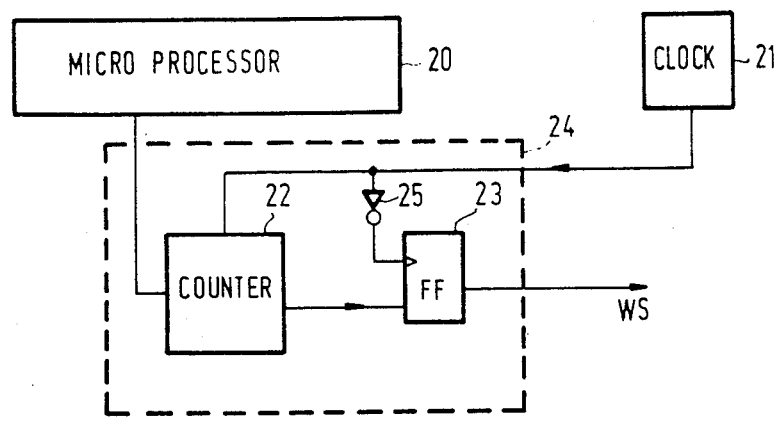
FIG. 3 shows an example of an embodiment of a word select signal generator.

The word select signal is generated by a word select signal generator which is part of the central control unit. Several implementations are possible for this generator. In case that data is provided by a digital data source, such as for example a compact disc, then the frequency of the word select signal is determined by the format of the outputted data words, which means that the source acts as word select signal generator. In case that data is provided by a source which supplies unformatted data (analog or digital), then a dedicated word select signal generator is required. FIG. 3 shows an example of such a dedicated word select signal generator. This generator 24 is connected to a clock 21, which supplies the clock pulse signal SCK, and to a microprocessor 20 which are part of the central control unit. The generator 24 comprises a counter 22 which has a first input connected to the clock 21 and a second input connected to the microprocessor 20. The counter 22 counts the supplied clock pulses, and is reset each time that a predetermined number of clock pulses has been reached. The value of said predetermined number is set by the microprocessor. The resetting of the counter produces an output signal which is supplied to a data input of a flip flop 23. A clock input of the flip flop 23 receives, via invertor 25, the inverted clock pulse signal. Flip flop 23 changes state on the leading edge of a pulse presented at its clock input.

The reception of said output signal by flip flop 23 will cause a state change of the flip flop as soon as a leading edge of a signal is received at its clock input, i.e. because of the inversion by a trailing edge of the clock pulse. The word select signal (WS) is outputted at a data output of flip flop 23.

Because flip flop 23 is controlled by the inverted clock pulse signal, the level of the word select signal will always change simultaneously with a trailing edge of the clock pulse signal as is illustrated in FIGS. 2(a) and (b). The clock pulse signal and the word select signal are thus synchronised with each other.

Under control of the microprocessor 20 the predetermined number of clock pulses between changes in level of the WS signal can be set to different values depending for example on the word length of the data word to be transmitted, or on the capacity of the transmitter or the receiver. This setting to different values means that the (time) length between two successive level changes of the word select signal is not fixed, but adaptable to several values. Because the counter 22 counts clock pulses, the time length between two successive level changes of the word select signal will always be a multiple of the clock pulse period. In particular the word select signal is thus adaptable to the number of bits comprised in the data word to be transmitted.

Figure 4:
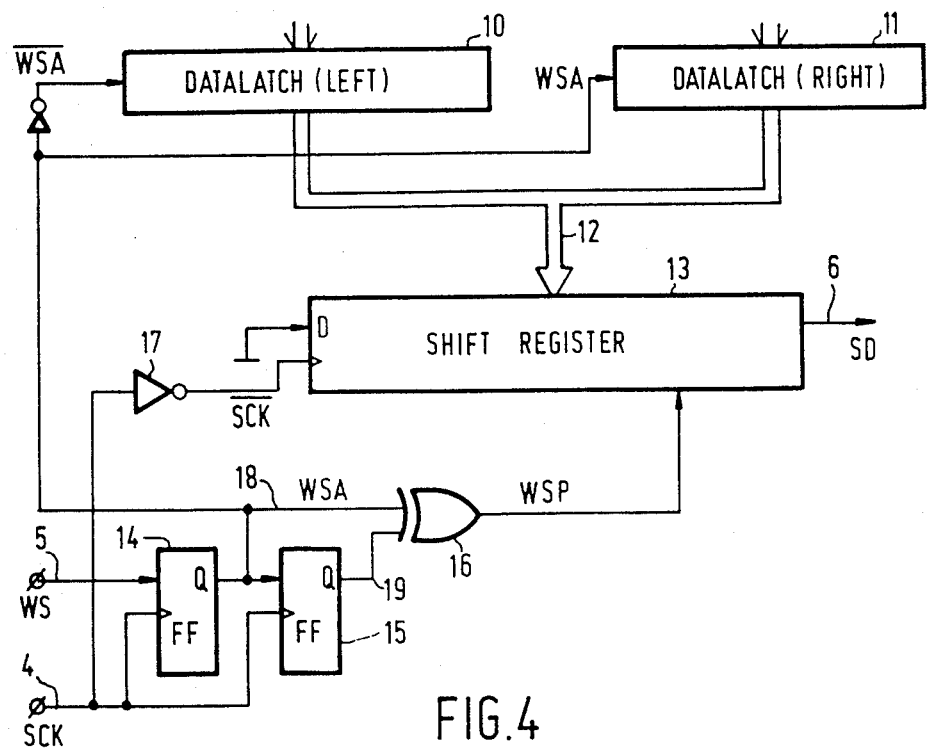
FIG. 4 shows a preferred embodiment of an audio transmitter according to the invention.

FIG. 4 shows a preferred embodiment of an audio transmitter. The transmitter comprises two data latches 10 and 11 for the temporary storage of the digital audio signal of the left (10) respectively and the right (11) audio channel, respectively, of the system. The latches have a control input for receiving a signal WSA (to be described hereunder), which is applied directly to latch 11 and inverted to latch 10. The outputs of the data latches 10 and 11 are connected via a bus 12 to a parallel data input of a shift register 13. The clock pulse signal (SCK) is applied inverted (via inverter 17) to a clock input of the shift register 13. A data output of the shift register is connected to the data line 6. Under the control of the trailing edges of the clock pulses, data bits of the data word stored in the shift register 13 are serially outputted on line 6. The transmitter also commprises two flip flops 14 and 15 which have their clock input connected to the clock line 4. A signal input of flip flop 14 is connected to word select line 5, and a signal output of flip flop 14 is connected to a signal input of flip flop 15 and also via line 18 to a first gate input of an exclusive OR gate 16. A second gate input of exclusive OR gate 16 is connected via line 19 to a signal output of flip flop 15. The output of exclusive OR gate 16 is connected to a control input of the shift register 13. The flip flops 14 and 15 are of that type that only change their state on the leading edge of a clock pulse presented at their clock input.

Suppose now that, as is illustrated in FIG. 2(b), the level of the word select signal WS changes from a high (logic "1") to a low (logic "0") level, and that, as is illustrated in FIG. 2(d), the level of the signal WSP at the output of exclusive OR gate 16 is low. Because the flip flops 14 and 15 only change their state on the leading edge of a clock pulse, the level change of WS will have no immediate effect on the signal WSP. However, the leading edge of the clock pulse following on the level changes of WS, will produce a state change of flip flop 14. This means that the level of signal WSA on line 18, as shown in FIG. (2g), will change from logic "1" to logic "0". Now there is on the first gate input of exclusive OR gate 16 a signal with level logic "0" and on the second gate input a signal with level logic "1". The signal WSP will thus become high as is illustrated in FIG. 2(d). This signal WSP will return to a low level when, on to the leading edge of the next clock pulse, the change of signal WSA applied to flip flop 15 causes a state transition in that flip flop. It shall be clear that also a change from low to high level of the word select signal will also cause a level change of signal WSP. The signal WSA will remain at the logic "0" level until the next level change in signal WS.

When the level of the word select signal WS changes from a high to a low level, the leading edge of the subsequent clock pulse will cause, as was already mentioned, a level change of ths signals WSP and WSA, namely WSA:=0 and WSP:=1 (:=stands for "becomes equal to"). Under control of $\overline{WSA}=1$ applied to the control input of data latch 10 and WSP=1 applied to the shift register 13, the data word preset in data latch 10 will be loaded in the shift register 13.

Under control of the trailing edge of said subsequent clock pulse, a first bit of the data word which was a moment ago loaded in the shift register 13 is outputted and supplied on the serial data line 6 as illustrated in FIG. 2(c).

Further bits of said data word are outputted under control of further trailing edges of the clock pulse signal.

The serial data input (D) of the shift register is set to zero. This is done so that if the data word present in the shift register 13 contains less bits than the number of clock pulses between two successive level changes of the word select signal, the word will be completed with zero's.

When the word select signal changes from low to high level, than WSA:=1 and WSP:=1. Under the control of WSA=1 and WSP=1 the data word present in data latch 11 is loaded into shift register 13, in order to be subsequently serially outputted on data line 6. By storing the data words of the left audio channel in data latch 10 and the data words of the right audio channel in data latch 11, and by outputting the data latches 10 and 11 alternatively, the independent audio channels are transmitted in time multiplex over the same serial data line.

For this preferred embodiment, the data words are always loaded in the shift register 13 in such a manner that the most significant bit (MSB) will always be the first one supplied to the serial data line 6 after the loading of the data word in the shift register. The MSB has then a fixed position with respect to a level change of the word select signal. In a transmitter according to FIG. 4 the MSB of a data word loaded in shift register 13 is always supplied to the serial data line 6, one clock pulse after that during which a level change of the word select signal occurred. This is illustrated in FIGS. 2(a), (b) and (c). There is thus a delay of one clock pulse between a level change of the word select signal and the supply of the MSB to the serial data line. This delay is necessary because in this embodiment the transmitter is the slave of the central control unit which supplies the word select signal. The transmitter is only able to load a new word in the shift register 13 after reception of a level change of the word select signal. By delaying over one clock pulse the transmission of MSB there is sufficient time to load said new data word. This delay is also important because, as already mentioned, the length between two successive level changes of the word select signal is not fixed. This means that the transmitter does not know when a next level change of the word select signal will occur. The transmitter must thus wait until it receives the level change of the word select signal.

Of course to delay the transmission of MSB over one clock pulse with respect to a level change of the word select signal is only a particular choice to which the invention in not limited. It would also be possible to delay the transmission of MSB over more than one clock pulse, if however care is taken that each data word to be transmitted contains at least as many bits as the number of clock pulses over which transmission is delayed. It would also be possible to delay said transmission of MSB overless than one clock pulse, for example half of a clock pulse period. Delaying less than half of a clock pulse period would also be possible but would impose severe restrictions on the operating capacity of the system.

The fact that the most significant bit (MSB) of a data word to be transmitted has a fixed position with respect to a level change of the word select signal is also related to the master-slave relation of the transmitter and the central control unit, even as to the non-fixed length between two successive level changes of the word select signal. If MSB is supplied as first bit of a new data word to be transmitted, then it will certainly be transmitted because there is at least one clock pulse during the time difference between two successive level changes of the word select signal. Also in case that the receiver should accept less bits then the number of bits comprised in the data word, then only the least significant bits (LSB) will be lost if MSB is transmitted first.

Figure 5:
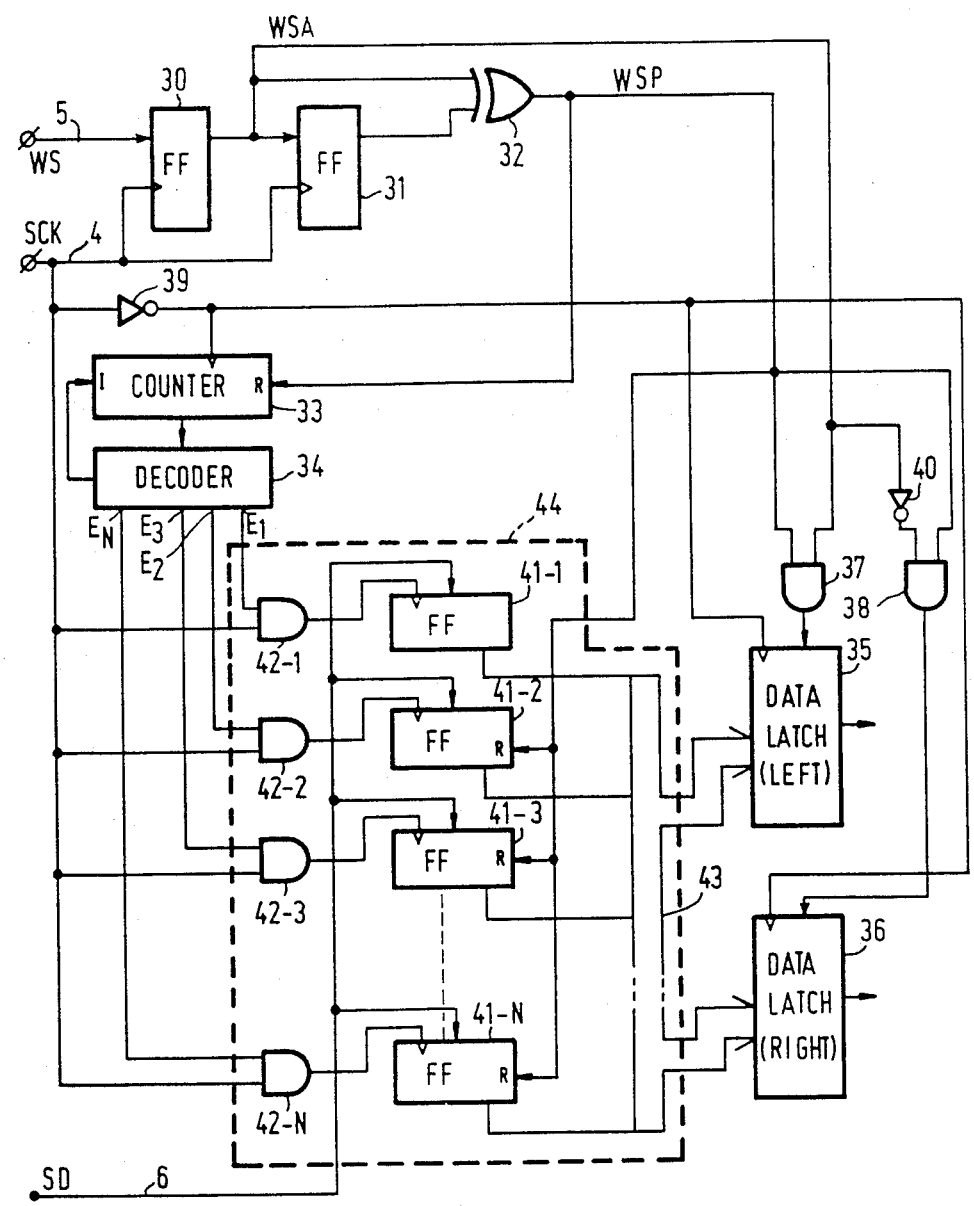
FIG. 5 shows a preferred embodiment of an audio receiver according to the invention.

FIG. 5 shows a preferred embodiment of an audio receiver to be used in a digital audio system according to the invention. The receiver comprises the flip flops 30, 31 and an exclusive OR gate 32 for generating the signal WSA and WSP in an analog manner as is done by the flip flops 14, 15 and the exclusive OR gate 16 of FIG. 4. The receiver further comprises a storage element 44 which comprises an array of N storage cells 41-1, 41-2, ..., 41-N, and which has data outputs connected to a bus 43. The bus 43 is connected to data inputs of a first (35) and a second (36) data latch. The data latches have a clock input for receiving the inverted (via inverter 39) clock pulse signal. The data latches 35 respectively 36 have a control input connected to a gate output of a logic AND gate 37 respectively 38. A first gate input of the logic AND gate 37 respectively 38 is connected to an output of the exclusive OR gate 32 for receiving the signal WSP. A second gate input of the logic AND gate 37 respectively 38 is connected directly, respectively via inverter 40 to an output of flip flop 30 for receiving the signal WSA respectively $\overline{WSA}$.

The receiver also comprises a counter 33 and a decoder 34. The counter 33 has a clock input for receiving the inverted (via inverter 39) clock pulse signal. The counter also has a reset input (R) connected with an output of the exclusive OR gate 32 for receiving the signal WSP. The counter counts the clock pulses, supplied at its clock input and is resetted each time that a signal WSP=1 is received at its reset input. An output of the counter is connected to an input of the decoder 34. Each time after counting j ($1 \leq j \leq N$) clock pulses, the value j is presented at the input of the decoder 34. The decoder decodes that value j and on the basis thereof, generates a pulse $E_j$ on its output $E_j$. The pulse pattern of the pulses $E_1$ and $E_2$ is illustrated in FIG. 2(e), and (f). The decoder 34 only accepts counting values which are less than or equal to N. After receiving the value N, the decoder will inhibit the counter until the counter is resetted by a signal WSP=1 (i.e. after a level change of the word select signal). The counter is inhibited by an inhibit signal applied to its input I. If the counter counts less than N clock pulses between two successive resets, than a corresponding number of $E_j$ pulses will not be generated. The consequences thereof will be described further.

The pulses $E_j$ are applied to first gate inputs of respective logic AND gates 42-j which being part of the storage element 44. Second gate inputs of the logic AND gates 42 are connected to the serial clock line 4 for receiving the clock pulse signal. Each respective logic AND gate 42-j has a gate output connected with a control input of his respective storage cell 41-j. The storage cells 41 are formed by flip flops. A data input of each storage cell is connected to the serial data line 6.

Suppose now that due to a level change of the word select signal, the signal WSA becomes equal to "0" and the signal WSP:=1. And suppose also that a data word is present in storage element 44, i.e. on bus 43. Because $\overline{WSA}=1$ and WSP=1, a value logic "1" will be outputted at the gate output of logic AND gate 38, which will enable data latch 36. Under control of the trailing edge of the present clock pulse, the data word present on bus 43 will be loaded into data latch 36. In order to be compatible with the choice made for the transmitter (signal WSA=1 reserved for loading the data words of the right audio channel in the shift register), the data latch 36 is reserved for loading the data words of the right audio channel, while data latch 35 is reserved for the data words of the left audio channel. Therefore data latch 35 is enabled when WSP=1 and WSA=1.

Almost simultaneously as the loading of a data word in data latch 36, a pulse $E_1$ is generated by the decoder 34. The leading edge of the subsequent clock pulse will enable logic AND gate 42-1 and thus flip flop 41-1. As mentioned by the description of the transmitter (FIG. 4, FIG. 2(c)), the most significant bit (MSB) of a data word to be transmitted is, under the present circumstances, present on data line 6. Because flip flop 41-1 is enabled, the MSB will thus be stored in flip flop 41-1 and outputted an bus 43. The bit which follows on MSB will, under control of $E_2$ and the leading edge of the next clock pulse, be stored in flip flop 41-2 and outputted on bus 43. This process of selective addressing of the flip flops will continue until either $E_n$ has been generated and each of the flip flops 41-1 to 41-N contains a received data bit, or the counter 33 has been resetted by a subsequent WSP=1 signal before $E_n$ could have been generated. Under the control of said subsequent WSP=1 signal the whole process will than be executed for a subsequent data word.

The fact that WSP=1 can be generated before $E_n$ could have been generated, implies that it is possible that some of the flip flops 41 do not receive a data bit. However this has no consequences for the number of data bits which are loaded in either one of the data latches 35 or 36. As is illustrated in FIG. 5, the flip flops 41-2 to 41-N have a reset input (R) connected with the gate output of exclusive OR gate 32 for receiving the signal WSP. This means that the trailing edge of a WSP=1 signal will reset the flip flops 41-2 to 41-N and thus provided that a logic "0" is present in the flip flops 41-2 to 41-N. This logic "0" can be overruled by a data bit presented at the data input of the flip flop. But if no data bit is presented to the flip flop, because the flip flop is not enabled by its respective $E_j$, than a logic "0" will be loaded at that respective bit location in the data latch. A data word to be loaded in one of the data latches 35 or 36 will thus, if necessary, be completed to an N-bits data word.

The receiver can thus accept data words of any word length. If the word length of the received data word is less than N-bits, than the data word is completed to an N-bits data word. If the word length of the received data word is more than N-bits, than the bits following the $N^{th}$ bit are ignored. Because the most significant bit is always received first (transmitted first), ignoring the LSB (at the end of the data word) will not pose a problem.

The signal WSP is not supplied to flip flop 41-1 in this embodiment. The reason is that in this embodiment the trailing edge of WSP=1 occurs almost simultaneously with the enabling of flip flop 41-1. If the signal WSP should than be presented to flip flop 41-1, there would be an interference between WSP and the MSB to be loaded. The flip flops 41-2 to 41-N are resetted under control of the trailing edge of WSP=1 in order to avoid interference between the resetting of the flip flops and the loading of the data latches.

The advantages of using a storage element 44 which comprises an array of flip flops 41-1 to 41-N is that the receiver than always knows the position of the MSB, namely at flip flop 41-1: This is particularly advantageous when the receiver acts as a slave and does not know when a next level change of the word select signal will occur; and thus consequently does not know how many bits an incomming word will contain.

Of course the present invention is not limited to that particular implementation of the storage element 44, which cooperates with counter 33 and decoder 34. An alternative implementation could for example comprise a register, selectively addressed by a pointer bit in a shift register.

By using a digital audio system according to the invention audio data words of different word length can be sent continuously and successively without losing time between successive data words due to fixed time length of the word select signal. In a digital audio system according to the invention the time length between two successive level changes of the word select signal is variable. The signal WSP generated, on the base of a level change of the word select signal, by the transmitter and the receiver enables the internal data processing of the transmitter and the receiver. When WSP becomes equal to the logic "1" (FIG. 2(d)) the LSB of a data word has already been transmitted on serial data line 6 (FIG. 2(c)). The shift register of the transmitter is thus ready for the storage of a subsequent data word, which is loaded under control of WSP=1. At the receiver side the LSB is loaded at the same time that WSP:=1. Thus the whole data word is present in the storage element and can thus be transferred under control of WSP=1 to one of the data latches 35 of 36. When WSP:=0 the storage element is enabled for loading the MSB of the subsequent data word.

What is claimed is:

1. A data transmission system comprising a control unit, clock means for supplying periodic clock pulses, a transmitter and a receiver, said transmitter and said receiver being connected by a transmission line for the serial transmission of data words consisting of a plurality of bits, and in which:

said control unit comprises:
  microprocessor controlled counting means having an input (input 1) connected to said clock means for receiving said clock pulses and an output (output 1) at which it produces a two-level word select (WS) signal having a time interval between successive level changes thereof which corresponds to a number of said clock pulses selected by said microprocessor controlled counting means;

said receiver comprises:
  a first input (input 2) connected to said microprocessor controlled counting means for receiving said WS signal;
  a second input (input 3) connected to said clock means for receiving said clock pulses; and a third input (input 4) connected to said transmission line for receiving data words transmitted by said transmitter;

said transmitter comprises:

transmission control means having a first input (input 5) connected to said clock means for receiving said clock pulses, a second input (input 6) connected to microprocessor controlled counting means for receiving said WS signal, a first output (output 2) at which it produces, in response to a level transition of said WS signal, a word read-in (WSA) signal which is synchronized with a clock pulse occurring after said level transition of said WS signal; and a second output (output 3) at which it produces a word read-out (WSP) signal substantially concurrently with said WSA signal;

storage means for temporarily storing a data word to be transmitted, said storage means having an output (output 4) connected to said transmission line and a control input (input 7) connected to said second output (output 3) of said transmission control means to receive said WSP signal, said storage means being adapted in response to said WSP signal to serially read-out a stored data word stored therein to said transmission line;

and data read-in means connected to said storage means and to said first output (output 2) of said transmission control means to receive said WSA signal and in response thereto to readi-in to said storage means a data word to be transmitted, such read-in being effected during the interval between said WSA signal and termination of the clock pulse which is synchronized therewith, whereby the time interval between successive level changes of said WS signal may be set by said microprocessor controlled counting means so that the transmission intervals of said data transmission system correspond with the lengths of the data words to be transmitted during such interval.

2. A data transmission system according to claim 1, wherein each data word consists of a plurality of bits of successive orders of significance, and the first bit of the stored data word serially read out of said storage means in response to said WSP signal is the most significant bit of such data word.

3. A data transmission system according to claim 1 or 2, wherein said receiver comprises a storage element for temporarily storing a received data word, said storage element having a data input connected to said transmission line, said storage element comprising an array of selectively addressable storage cells, said storage cells being selectively addressed under control of successive received clocks pulses.

4. A data transmission system according to claim 3, wherein said receiver further comprises a counter for counting said clock pulses, said counter being resettable under control of a level change of said WS signal; and a decoder connected to said counter for translating the respective counts thereof into respective address signals for selecting respective storage cells of said storage element, such address signals being produced at respective output terminals of said decoder.

5. A data transmission system as claimed in claim 4, wherein each storage cell of said storage element has an enabling input and comprises a logic AND gate having a gate output connected to the enabling input of such storage cell; said logic AND gates respectively having a first gate input connected to said clock means for receiving said clock pulses and a second gate input connected with one of the outputs of said decoder for receiving one of said address signals.

6. A data transmission system according to claim 1 or 2, wherein said data transmission system is a digital audio system.

7. A data transmission system comprising a control unit, clock means for supplying a clock pulse signal, a transmitter and a receiver, said transmitter and said receiver being connected by a transmission line for the bit serial transmission of data words, (a) said control unit comprising:
(i) a word length signal generator for generating word length signals, each word length signal indicating a first number of successive clock pulses, said word length signal generator including means for selecting said first number of clock pulses from a set of integers;
(ii) a word select signal generator for generating a two level word select signal having a plurality of level transitions, each level transition being from one of said two levels to the other, said word select signal generator having a clock signal input for receiving said clock pulse signal, a further input for receiving said word length signals and a signal output for supplying said word select signal, said word select signal generator, under control of said word length signal, generating a present level transition in said word select signal, when a second number of clock pulses between the present level transition and a last preceding level transition equals said first number of clock pulses indicated by a present one of said word length signals;

(b) said transmitter comprising transmission control means synchronized by said clock pulse signal and enabling transmission of data words under control of said level transitions of word select signal, said transmission control means comprising:
(i) a clock signal input for receiving said clock pulse signal;
(ii) an input coupled with said signal output of said word select signal generator;
(iii) storage means for temporarily storing a data word, said storage means having a data output connected to said transmission line; and
(iv) means for loading said data word to be transmitted into said storage means, under control of said level transitions of said word select signal;

(c) said receiver having an input connected to said signal output of said word select signal generator.

8. The data transmission system of claim 7, wherein said transmission control means enables transmission of a first data bit of said loaded data word at said data output with a delay of at least a half clock pulse with respect to the respective level transition of said word select signal.

9. The data transmission system of claim 8 wherein said first data is the most significant bit of said data word.

10. The data transmission system of claim 7, wherein said receiver comprises:
(a) a clock signal input for receiving said clock pulse signal; and
(b) a storage device for temporarily storing a received data word, said storage device having a data input connected to said transmission line, said storage device comprising an array of selectively addressable storage cells, said storage cells being selectively addressed under control of successive received clock pulses.

11. The data transmission system of claim 10, wherein said receiver comprises:
(a) a counter for counting the clock pulses of said clock pulse signal, said counter being resettable under control of said level transitions of said word select signal; and
(b) a decoder, having an input coupled with an output of said counter, an output of said decoder being connected to said storage device, said decoder being for translating counted values of said counter into select signals for selecting the storage cells of said array.

12. The data transmission system of claim 11, wherein:
(a) each storage cell of said array comprises an enable input,
(b) said storage device further comprises for each storage cell a dedicated logic AND gate, each of said logic AND gates having its gate output connected to the enable input of its respective storage cell; each of said logic AND gates having a first gate input for receiving said clock pulse signal and a second gate input connected with a respective output of said decoder for receiving a respective select signal.

13. The data transmission system of claim 7, wherein said data transmission system is a digital audio system.

14. The data transmission system of claim 7, wherein said transmitter is a digital audio transmitter, said receiver is a digital audio receiver, and said data words are digital audio data words.

15. A data transmitter for the bit serial transmission of data words of variable length comprising:
(a) a clock input for receiving clock pulse signals;
(b) a word select input for receiving a two level word select signal with a plurality of level transitions between said two levels, each level transition of said word select signal representing a respective data word, there being a number of clock pulses between two successive transitions corresponding to a word length of the respective data word;
(c) an output for coupling to a transmission line;
(d) transmission control means synchronized by said clock pulse signal and enabling transmission of data words under control of said level transitions of said word select signal including:
(i) means for temporarily storing a data word to be transmitted and having an output coupled to said output of the transmitter;
(ii) means for loading said data word to be transmitted into said storing means under control of said level transitions of said word select signal.

16. A data receiver for receiving bit serial data words of variable length comprising:
(a) a clock signal input for receiving clock pulse signals;
(b) a word select input for receiving a two level word select signal with a plurality of level transitions between said two levels, each level transition of said word select signal representing a respective data word, there being a number of clock pulses between two successive transitions corresponding to a word length of the respective data word;
(c) a data input for coupling to a transmission line;
(d) a storage device for storing said data words of variable length under control of said word select signal, said storage device having an array of selectively addressable storage cells for storing data receiving at said data input of the receiver, said storage cells being selectively addressed under control of said clock pulses.

17. Data transmission system comprising a control unit, clock means for supplying a clock pulse signal, a transmitter and a receiver, said transmitter and said receiver being connected by a transmission line for the serial transmission of a series of data words in a sequence of serial data bits;
(a) said control unit comprising:
a word select signal generator, having:
(A) a clock input for receiving said clock pulse signal;
(B) means for generating a two level word select signal for selecting a data word to be transmitted including means for setting a time interval between two successive level transitions of said word select signal to one of a set of time values, each of said time values of said set corresponding to a whole number of clock pulses of said clock pulse signal whereby each level transition corresponds to a variable length data word having a length corresponding to the number of clock pulses corresponding to the respective time interval succeeding each level transition; and
(C) a signal output at which said word select signal is supplied;
(b) said receiver comprising a first input connected with said signal output of said word select signal generator;
(c) said transmitter comprising:
(i) transmission control means having:
(A) a clock input for receiving said clock pulse signal;
(B) a second input coupled with said signal output;
(C) storage means for temporarily storing a data word, said storage means having a data output connected to said transmission line; and
(D) means for loading a data word to be transmitted into said storage means under control of said level transitions of said word select signal.

18. Data transmission system as claimed in claim 17, wherein transmission control means comprises means for outputting at said data output a most significant bit of said loaded data word as a first data bit of said loaded data word.

* * * * *